US011086481B2

(12) United States Patent
Anghelescu et al.

(10) Patent No.: US 11,086,481 B2
(45) Date of Patent: Aug. 10, 2021

(54) DISPLAYING DATA FOR A PREFERRED WELL

(71) Applicant: Landmark Graphics Corporation, Houston, TX (US)

(72) Inventors: Florin Mugur Anghelescu, Calgary (CA); David Crawshay, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 1286 days.

(21) Appl. No.: 14/901,984

(22) PCT Filed: Jul. 29, 2013

(86) PCT No.: PCT/US2013/052537
§ 371 (c)(1),
(2) Date: Dec. 29, 2015

(87) PCT Pub. No.: WO2015/016812
PCT Pub. Date: Feb. 5, 2015

(65) Prior Publication Data
US 2016/0132196 A1    May 12, 2016

(51) Int. Cl.
*G06F 3/0482* (2013.01)
*H04W 4/029* (2018.01)
(Continued)

(52) U.S. Cl.
CPC ............ *G06F 3/0482* (2013.01); *E21B 41/00* (2013.01); *E21B 47/00* (2013.01);
(Continued)

(58) Field of Classification Search
CPC .... G06F 17/212; G06F 17/241; G06F 17/245; G06F 3/0484; G06F 3/0482;
(Continued)

(56) References Cited

U.S. PATENT DOCUMENTS 5,864,772 A * 1/1999 Alvarado .............. H04L 69/329
702/9
6,749,029 B2 * 6/2004 Alft .......................... E21B 7/04
175/24
(Continued)

FOREIGN PATENT DOCUMENTS

| EA | 15887 | 12/2011 |
|---|---|---|
| RU | 2316052 | 1/2006 |
| WO | 2013095440 | 6/2013 |

OTHER PUBLICATIONS

RequestAnApp.com; "Oil and Gas Well Locator (PRO)", Retrieved from the Internet:URL:https://play.google.com/store/apps/details?id=com.requestanapp.oilgaswellpaid&hl=en, 2012.
(Continued)

Primary Examiner — Tadesse Hailu
(74) Attorney, Agent, or Firm — Kilpatrick Townsend & Stockton LLP

(57) ABSTRACT

Systems and methods for displaying a preferred well on a mobile device displaying data for another well and reconfiguring a system based on geographical coordinates for the mobile device and/or the system.

16 Claims, 2 Drawing Sheets

(51) Int. Cl.
*E21B 47/00* (2012.01)
*E21B 41/00* (2006.01)
*G06F 3/0484* (2013.01)

(52) U.S. Cl.
CPC ........ *G06F 3/04847* (2013.01); *H04W 4/029* (2018.02); *G01V 2210/16* (2013.01)

(58) Field of Classification Search
CPC ........... G06F 3/04847; G01V 2210/16; H04W 4/029; E21B 41/00; E21B 47/00
See application file for complete search history.

(56) References Cited

U.S. PATENT DOCUMENTS

| | | | |
|---|---|---|---|
| 2004/0075566 A1* | 4/2004 | Stepanik | G08B 21/12 340/632 |
| 2004/0078306 A1* | 4/2004 | Whiteley | G06Q 10/06 705/28 |
| 2004/0231851 A1* | 11/2004 | Silvers | E21B 47/00 166/350 |
| 2006/0069503 A1* | 3/2006 | Suomela | G01C 21/3641 701/431 |
| 2006/0197678 A1* | 9/2006 | Silvers | E21B 47/00 340/854.6 |
| 2007/0161382 A1* | 7/2007 | Melinger | H04L 67/18 455/456.1 |
| 2008/0195702 A1* | 8/2008 | Matz | H04W 4/02 709/204 |
| 2008/0242311 A1* | 10/2008 | Craine | G08B 21/0269 455/456.1 |
| 2009/0153354 A1* | 6/2009 | Daussin | E21B 43/26 340/853.1 |
| 2010/0141261 A1* | 6/2010 | Overby | G01V 3/12 324/329 |
| 2011/0257885 A1* | 10/2011 | Tuck | G01C 21/30 701/472 |
| 2012/0066026 A1 | 3/2012 | Dusig et al. | |
| 2012/0158305 A1* | 6/2012 | Rodney | G01V 3/26 702/6 |
| 2012/0190386 A1* | 7/2012 | Anderson | G01C 15/04 455/456.3 |
| 2013/0091452 A1* | 4/2013 | Sorden | G06N 5/04 715/771 |
| 2014/0025413 A1* | 1/2014 | Yeager | G06Q 10/0631 705/7.12 |
| 2014/0078306 A1* | 3/2014 | Miyoshi | B60R 1/00 348/148 |
| 2014/0129296 A1* | 5/2014 | Muraviyova | G06Q 10/06393 705/7.39 |
| 2014/0135037 A1* | 5/2014 | Dave | H04W 4/21 455/456.3 |
| 2015/0090496 A1* | 4/2015 | Rempe | E21B 47/02224 175/45 |
| 2016/0098174 A1* | 4/2016 | Anghelescu | E21B 41/00 715/738 |
| 2017/0058671 A1* | 3/2017 | Elkins | B09B 1/00 |

OTHER PUBLICATIONS

Australian Patent Application No. 2013395720, First Examiner Report, dated Jul. 6, 2016, 3 pages.
Canadian Patent Application No. 2,916,361, Office Action, dated Dec. 20, 2016, 3 pages.
Canadian Patent Application No. 2,916,361, Office Action, dated Nov. 28, 2017, 3 pages.
Halliburton , "OpenWells Mobile for Workovers", Jul. 19, 2013, 1 page (retrieved on https://itunes.apple.com/us/app/openwells-mobile-for-workovers/id526026850?mt=8).
International Patent Application No. PCT/US2013/052537, International Search Report and Written Opinion, dated Oct. 22, 2013, 10 pages.
Russian Patent Application No. 2015155447, Office Action, dated Dec. 28, 2016, 7 pages.

* cited by examiner

DISPLAYING DATA FOR A PREFERRED WELL

CROSS-REFERENCE TO RELATED APPLICATIONS

This application claims the priority of PCT Patent Application No. PCT/US13/52537, filed on Jul. 29, 2013, which is incorporated herein by reference.

STATEMENT REGARDING FEDERALLY SPONSORED RESEARCH

Not applicable.

FIELD OF THE DISCLOSURE

The present disclosure generally relates to systems and methods for displaying data for a preferred well. More particularly, the present disclosure relates to displaying data for a preferred well on a mobile device displaying data for another well and reconfiguring a system based on geographical coordinates for the mobile device and/or the system.

BACKGROUND

In the oil and gas industry, managing and optimizing drilling operations requires an information management system that can capture, track, report and analyze many activities at the rig or platform. Conventional information management systems may manage and track drilling and completion activities for a few wells or across an entire organization. In addition, such systems may manage operations for the full life of a well. Typically, each well must be identified from a list of wells to access such information. Moreover, data for a well may be already displayed on a mobile device when data for another well is preferred. Because of the volume of wells typically documented across an entire organization, this process of accessing information about a particular well can be very time consuming, inefficient and inaccurate if the wrong well is selected. In addition, conventional information management systems may need to be manually configured for each well location and/or well activity. Due to the number of well locations, well activities and different system configurations based on the same, this process can also be very time consuming, inefficient and inaccurate.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

Figure 1:
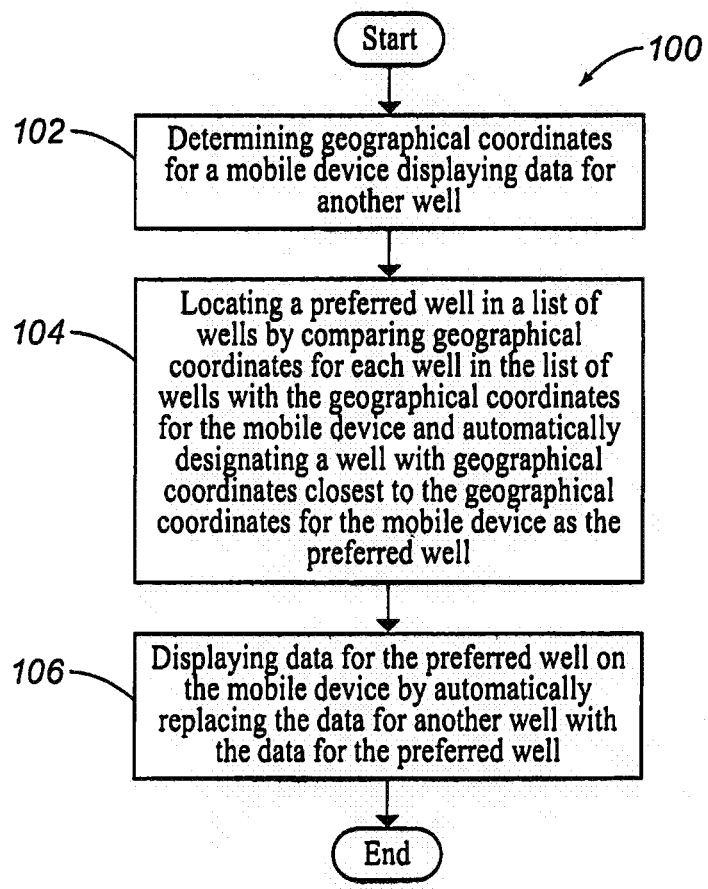
FIG. 1 is a flow diagram illustrating one embodiment of a method for implementing the present disclosure.

The present disclosure therefore, overcomes one or more deficiencies in the prior art by providing systems and methods for displaying a preferred well on a mobile device displaying data for another well and reconfiguring a system based on geographical coordinates for the mobile device and/or the system.

In one embodiment, the present disclosure includes a method for displaying data for a preferred well on a mobile device, which comprises: i) determining geographical coordinates for the mobile device using the mobile device; ii) locating the preferred well in a list of wells by comparing geographical coordinates for each well in the list of wells with the geographic coordinates for the mobile device and automatically designating a well with geographical coordinates closest to the geographical coordinates for the mobile device as the preferred well when the geological coordinates for the mobile device are determined; and iii) displaying the data for the preferred well on the mobile device.

In another embodiment, the present disclosure includes a non-transitory program carrier device tangibly carrying computer executable instructions for displaying data for a preferred well on a mobile device, the instructions being executable to implement: i) determining geographical coordinates for the mobile device using the mobile device; ii) locating the preferred well in a list of wells by comparing geographical coordinates for each well in the list of wells with the geographic coordinates for the mobile device and automatically designating a well with geographical coordinates closest to the geographical coordinates for the mobile device as the preferred well when the geological coordinates for the mobile device are determined; and iii) displaying the data for the preferred well on the mobile device.

In yet another embodiment, the present disclosure includes a method for reconfiguring a system on a computer, which comprises: i) determining geographical coordinates for the system; and ii) reconfiguring the system by automatically replacing at least one of a parameter, a data format and data for the system with at least one of a respective new parameter, new data format and new data when the geographical coordinates for the system are determined, the new parameter, the new data format and the new data being associated with the geographical coordinates for the system.

In yet another embodiment, the present disclosure includes a non-transitory program carrier device tangibly carrying computer executable instructions for reconfiguring a system on a computer, the instructions being executable to implement: i) determining geographical coordinates for the system; and ii) reconfiguring the system by automatically replacing at least one of a parameter, a data format and data for the system with at least one of a respective new parameter, new data format and new data when the geographical coordinates for the system are determined, the new parameter, the new data format and the new data being associated with the geographical coordinates for the system.

The subject matter of the present disclosure is described with specificity, however, the description itself is not intended to limit the scope of the disclosure. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order. While the following description refers to the oil and gas industry, the systems and methods of the present disclosure are not limited thereto and may also be applied in other industries to achieve similar results.

Method Description

Referring now to FIG. 1, a flow diagram of one embodiment of a method 100 for implementing the present disclosure is illustrated.

In step 102, geographical coordinates for a mobile device displaying data for another well are determined using the mobile device, a satellite and/or techniques well known in the art. Alternatively, the mobile device may not be displaying data for another well.

In step 104, a preferred well in a list of wells is located by comparing geographical coordinates for each well in the list of wells with the geographic coordinates for the mobile device and automatically designating a well with geographical coordinates closest to the geographical coordinates for the mobile device as the preferred well when the geographical coordinates for the mobile device are determined.

In step 106, data for the preferred well are displayed on the mobile device by automatically replacing the data for the another well with the data for the preferred well. Alternatively, data for the preferred well may be displayed without automatically replacing the data for the another well when such data for the another well is not already displayed. In this manner, the method 100 permits data for a preferred well to be readily displayed without searching for the well location in a list of wells and potentially identifying the wrong well. The preferred well is thus, automatically located and identified, with its respective data, when the geographical coordinates for the mobile device are determined.

Figure 2:
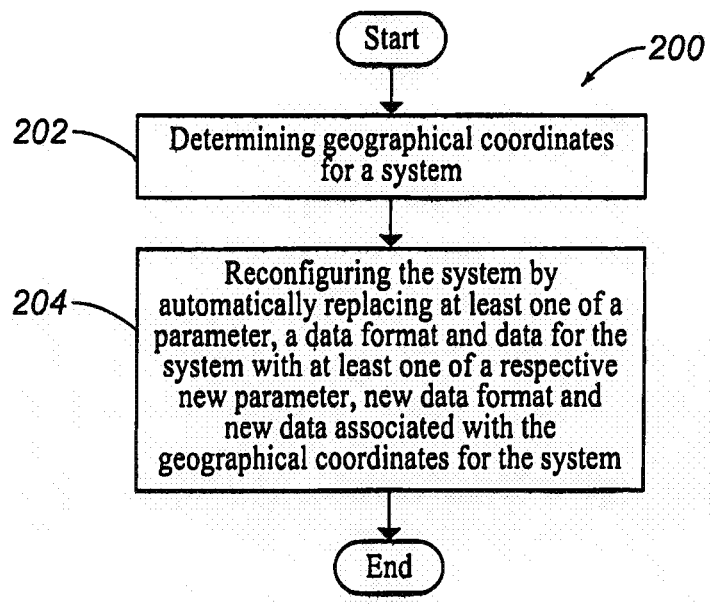
FIG. 2 is a flow diagram illustrating another embodiment of a method for implementing the present disclosure.

Referring now to FIG. 2, a flow diagram of another embodiment of a method 200 for implementing the present disclosure is illustrated.

In step 202, geographical coordinates for a system on a computer are determined using the computer, a satellite and/or techniques well known in the art.

Figure 3:
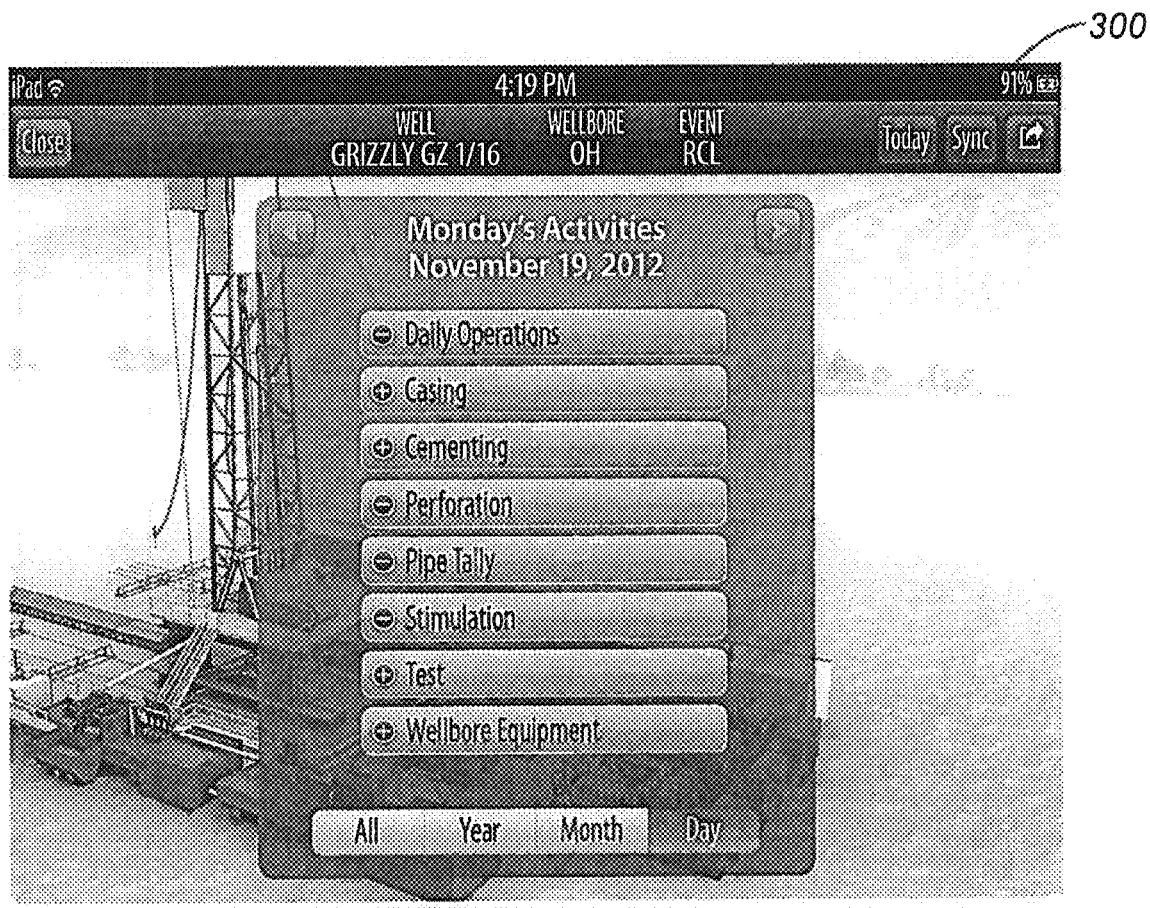
FIG. 3 is a display of a reconfigured system illustrating step 204 in FIG. 2.

In step 204, the system is reconfigured by automatically replacing at least one of a parameter, a data format and data for the system with at least one of a respective new parameter, new data format and new data when the geographical coordinates for the system are determined. The new parameter, the new data format and the new data are associated with the geographical coordinates for the system and/or a system phase. In the oil and gas industry, for example, the geographical coordinates for the system may represent a well location and the system phase may represent a well activity. In FIG. 3, for example, the display 300 of a system reconfigured according to this step illustrates a graphical user interface for potentially accessing new parameters, new data formats and/or new data that are associated with the geographical coordinates for the GRIZZLY GZ 1/16 well location and/or the workover well activity. In this manner, the geographical coordinates for the system can be used to configure/reconfigure the system to i) allow only certain data to be viewed or edited; ii) allow access to custom formatted reports; and iii) restrict other rights and/or access. This step is therefore, automatically performed as soon as the geographical coordinates for the system are determined and eliminates the need to manually configure/reconfigure a system at each well location for each well activity. Any updates and/or changes to a particular system can be performed at a single central server location and accessed remotely by the method 200. In another application, the method 200 may be applied in the automobile industry. When a car crosses a border, for example, from the US to Canada, the car's computer system should automatically change the odometer and speedometer display from miles per hour to kilometers per hour.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. OpenWells®, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g., various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Figure 4:
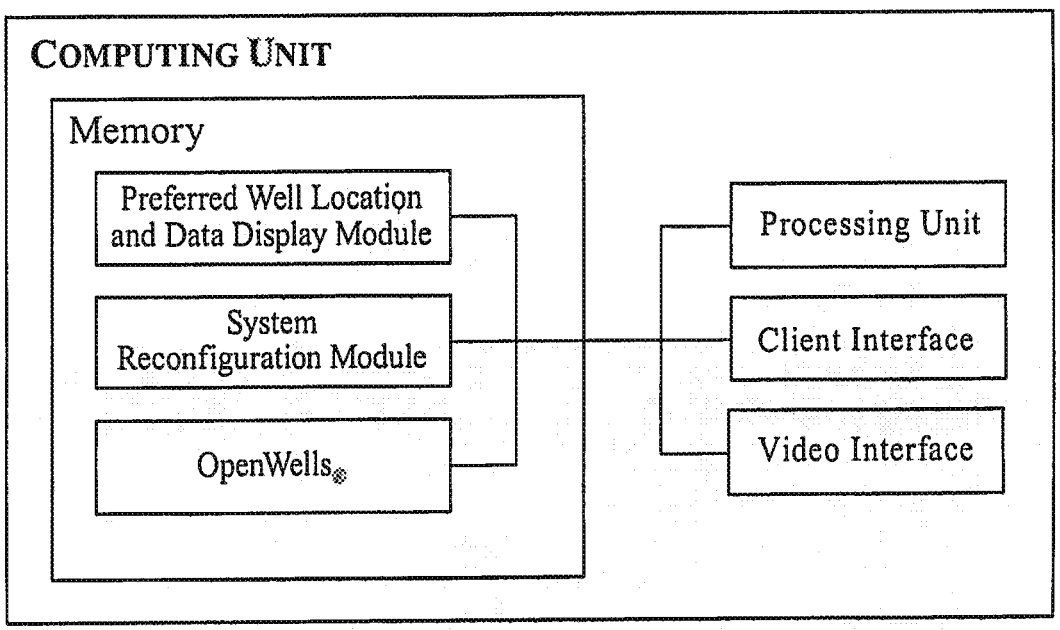
FIG. 4 is block diagram illustrating one embodiment of a computer system for implementing the present disclosure.

Referring now to FIG. 4, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 1-3. The memory therefore, includes a preferred well location and data display module, which enables the method 100 described in reference to FIG. 1 and a system reconfiguration module, which enables the method 200 described in reference to FIG. 2. The foregoing modules may integrate functionality from the remaining application programs illustrated in FIG. 4. In particular, OpenWells® may be used as an interface application to perform step 106 in FIG. 1 and displaying the results of step 204 in FIG. 2. OpenWells® includes an electronic map with data pertaining to each well such as, for example, the geographical location and well activities for each well. OpenWells® may be used on a desktop computer or mobile device with a processor. Although OpenWells® may be used as an interface application, other interface applications may be used, instead, or each module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for displaying data for a preferred well on a mobile device, which comprises:
    determining geographical coordinates for the mobile device using a satellite system of the mobile device;
    locating the preferred well in a list of wells by comparing geographical coordinates for each well in the list of wells with the geographical coordinates for the mobile device and automatically designating a well with geographical coordinates closest to the geographical coordinates for the mobile device as the preferred well when the geographical coordinates for the mobile device are determined; and
    displaying the data for the preferred well on the mobile device.

2. The method of claim 1, wherein the data for the preferred well is displayed on the mobile device by automatically replacing data for another well displayed on the mobile device with the data for the preferred well.

3. The method of claim 1, wherein the preferred well is located in the list of wells based only on the geographical coordinates for each well in the list of wells and the geographical coordinates for the mobile device.

4. The method of claim 1, further comprising:
    moving the mobile device to another location with new geographical coordinates;
    determining the new geographical coordinates for the mobile device using the satellite system of the mobile device;
    locating a new preferred well in the list of wells by comparing the geographical coordinates for each well in the list of wells with the new geographical coordinates for the mobile device and automatically designating a well with geographical coordinates closest to the new geographical coordinates for the mobile device as the new preferred well when the new geographical coordinates for the mobile device are determined; and
    displaying the data for the preferred well on the mobile device by automatically replacing the data for the preferred well displayed on the mobile device with data for the new preferred well.

5. A non-transitory program carrier device tangibly carrying computer executable instructions for displaying data for a preferred well on a mobile device, the instructions being executable to implement:
    determining geographical coordinates for the mobile device using a satellite system of the mobile device;
    locating the preferred well in a list of wells by comparing geographical coordinates for each well in the list of wells with the geographical coordinates for the mobile device and automatically designating a well with geographical coordinates closest to the geographical coordinates for the mobile device as the preferred well when the geographical coordinates for the mobile device are determined; and
    displaying the data for the preferred well on the mobile device.

6. The program carrier device of claim 5, wherein the data for the preferred well is displayed on the mobile device by automatically replacing data for another well displayed on the mobile device with the data for the preferred well.

7. The program carrier device of claim 5, wherein the preferred well is located in the list of wells based only on the geographical coordinates for each well in the list of wells and the geographical coordinates for the mobile device.

8. The program carrier device of claim 5, in response to moving the mobile device to another location with new geographical coordinates, further comprising:
   determining the new geographical coordinates for the mobile device using the satellite system of the mobile device;
   locating a new preferred well in the list of wells by comparing the geographical coordinates for each well in the list of wells with the new geographical coordinates for the mobile device and automatically designating a well with geographical coordinates closest to the new geographical coordinates for the mobile device as the new preferred well when the new geographical coordinates for the mobile device are determined; and
   displaying the data for the preferred well on the mobile device by automatically replacing the data for the preferred well displayed on the mobile device with data for the new preferred well.

9. A method for reconfiguring a system on a computer, which comprises:
   determining geographical coordinates for the system using a satellite system of the computer;
   locating a preferred well in a list of wells by comparing geographical coordinates for each well in the list of wells with the geographical coordinates for the system and automatically designating a well with geographical coordinates closest to the geographical coordinates for the system as the preferred well; and
   reconfiguring the system by automatically replacing at least one of a parameter, a data format, and data for the system with at least one of a respective new parameter, new data format, and new data associated with the preferred well when the geographical coordinates for the system are determined.

10. The method of claim 9, wherein the new parameter, the new data format, and the new data are associated with a system phase.

11. The method of claim 10, wherein the system phase represents a well activity of the preferred well.

12. The method of claim 9, wherein the new parameter represents rights to access or edit data or new data for the system and the new data format represents one or more custom formatted reports.

13. A non-transitory program carrier device tangibly carrying computer executable instructions for reconfiguring a system on a computer, the instructions being executable to implement:
   determining geographical coordinates for the system using a satellite system of the computer;
   locating a preferred well in a list of wells by comparing geographical coordinates for each well in the list of wells with the geographical coordinates for the system and automatically designating a well with geographical coordinates closest to the geographical coordinates for the system as the preferred well; and
   reconfiguring the system by automatically replacing at least one of a parameter, a data format, and data for the system with at least one of a respective new parameter, new data format, and new data associated with the preferred well when the geographical coordinates for the system are determined.

14. The program carrier device of claim 13, wherein the new parameter, the new data format, and the new data are associated with a system phase.

15. The program carrier device of claim 14, wherein the system phase represents a well activity of the preferred well.

16. The program carrier device of claim 13, wherein the new parameter represents rights to access or edit data or new data for the system and the new data format represents one or more custom formatted reports.

* * * * *